Aug. 26, 1952  B. G. RICH  2,608,272
LUBRICATING MEANS FOR CHANGE-SPEED TRANSMISSIONS AND THE LIKE
Filed Sept. 21, 1948
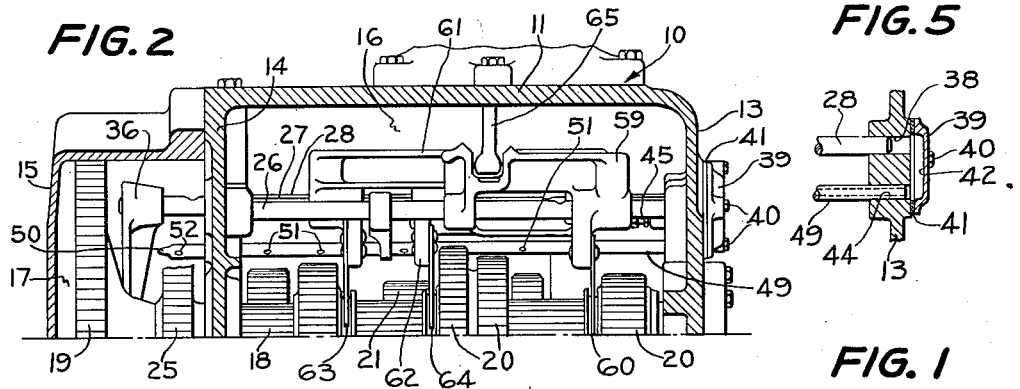
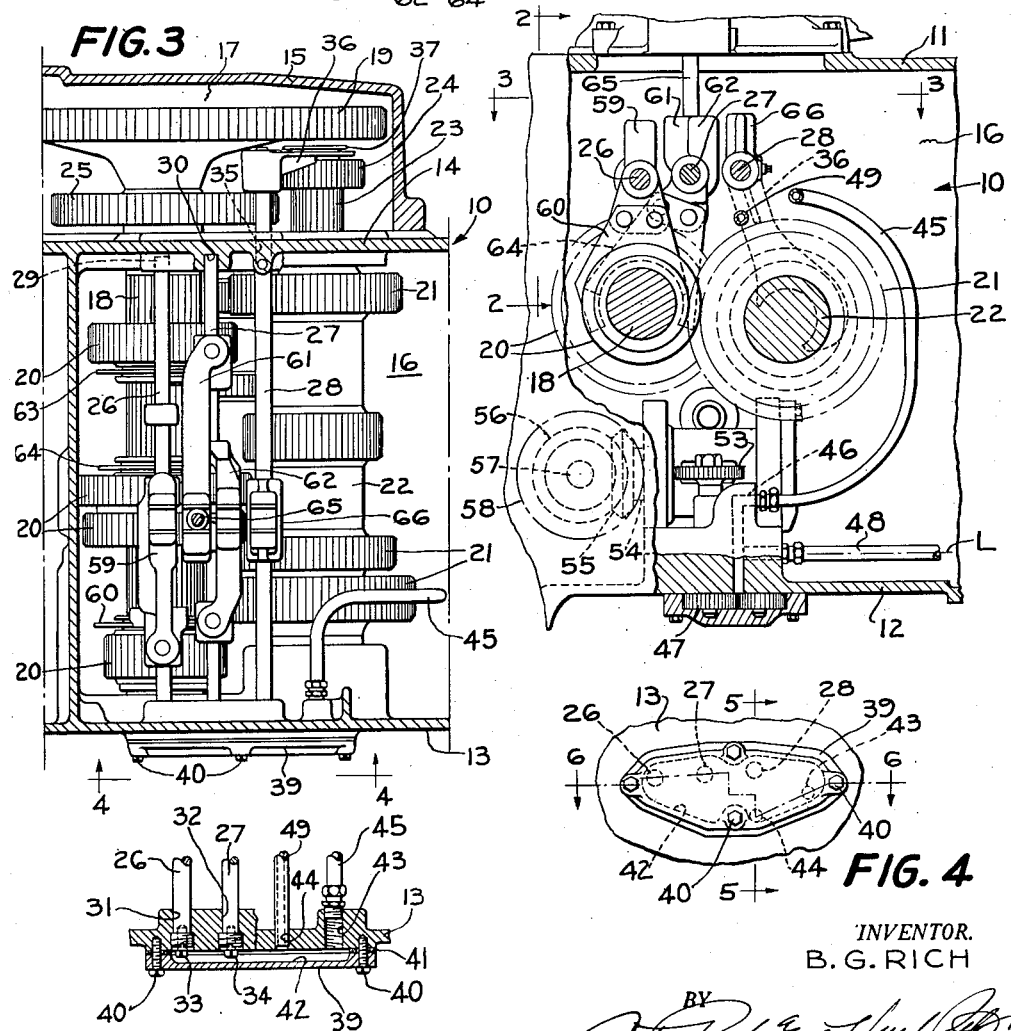
INVENTOR.
B. G. RICH
ATTORNEYS Patented Aug. 26, 1952

2,608,272

UNITED STATES PATENT OFFICE 2,608,272

LUBRICATING MEANS FOR CHANGE-SPEED TRANSMISSIONS AND THE LIKE

Barrett G. Rich, Waterloo, Iowa, assignor to Deere Manufacturing Co., Dubuque, Iowa, a corporation of Iowa Application September 21, 1948, Serial No. 50,258

11 Claims. (Cl. 184—6)

This invention relates to driving mechanisms such as change-speed transmissions or the like and more particularly to improved means for lubricating such mechanisms.

Taking the conventional change-speed transmission as typical of a driving mechanism to which the invention may be applied, it is known that such transmissions ordinarily include a housing having a lower portion adapted to contain lubricant at a certain level. The housing carries driving means in the form of parallel shafts on which are mounted interengageable gears, certain of which are axially slidable or shiftable on one or the other of the shafts. In many instances, the particular design of the transmission requires that the transmission gears rotate at a fairly high level relative to the lubricant level and, unless the housing contains a substantial supply of lubricant, the gears and supporting bearings will be inappropriately lubricated. According to the present invention, it is an object to provide improved lubricating means for distributing lubricant to the gears at a level above the lubricant level in the housing.

In the case of a change-speed transmission having shaftable gears, it is ordinary practice to provide one or more shifter rods usually located above the transmission shafts and slidable back and forth to operate shifter forks engageable with the slidable gears. In certain prior constructions, the shifter rods have not been satisfactorily lubricated. In the present case, the invention contemplates the provision of lubricant reservoir means including openings or passages communicating with one or more shifter rods for the purpose of supplying lubricant thereto. Another object of the invention is to utilize the reservoir means as part of the lubricant-supply means for the transmission gears. Specifically, the invention in this respect provides that a supporting wall portion of the housing be provided with an external portion to which is tightly secured a cover having a pocket forming the lubricant reservoir. The cover means is secured to the wall portion in such manner that it encloses or overlaps the supporting openings for the shifter rods, whereupon the cover further serves as a dust-tight enclosure for these openings, in addition to which the pocket therein receives and contains a supply of lubricant. It is a further object of the invention to provide a lubricant pump for supplying lubricant to the reservoir or pocket in the cover means. In a more specific aspect, it is an object of the invention to provide driving mechanism including a housing having a pair of compartments and to provide a lubricant-distributing means for carrying lubricant across one compartment and into the other. In the case of the lubricant-distributing means, it is an object to provide this means in the form of an elongated, perforated tube in which the perforations comprise distributing elements for supplying or discharging lubricant to the transmission gears or equivalent drive means.

The foregoing and other important objects and desirable features inherent in and encompassed by the invention will become apparent to those skilled in the art as a complete disclosure is made of a preferred form of the invention in the following detailed description and accompanying sheet of drawings, in which Figure 1 is an end view of a change-speed transmission, with the near wall removed to expose the interior of the transmission construction;

Figure 2 is a fragmentary vertical sectional view taken substantially on the line 2—2 of Figure 1;

Figure 3 is a plan view in section, as viewed along the line 3—3 of Figure 1;

Figure 4 is a face view of one end wall of the transmission as viewed along the line 4—4 of Figure 3;

Figure 5 is a vertical sectional view taken substantially on the line 5—5 of Figure 4; and Figure 6 is a longitudinal sectional view taken substantially on the line 6—6 of Figure 4.

The transmission to which the invention may be applied may be of any conventional construction. That shown is of the type included in the subject matter of assignee's co-pending application, Serial No. 43,736, filed August 11, 1948, and includes a housing 10 provided with a top wall 11, a bottom wall 12, and a plurality of vertical walls 13, 14 and 15, whereby the housing includes a pair of compartments 16 and 17. The walls 13 and 15 are outer walls and the wall 14 is an inner wall which separates the two compartments. In the particular design illustrated, the compartment 17 is provided by a secondary housing which includes the wall 15 and which is secured to the wall 14; although the detailed arrangement may be ignored apart from the provision of the two compartments 16 and 17 as provided by the walls 13, 14 and 15.

The general arrangement of the transmission illustrated is of the type utilized in a tractor in which the engine crank shaft is transverse to the longitudinal axis of the tractor, as in the U. S. patent to McCray 1,873,447. The relationship of a transmission similar to that shown in the present application to such transverse engine crank shaft is clearly illustrated in the U. S. patent to McCormick 2,103,543. The distinction between the particular type of transmission illustrated and the ordinary transmission may be ignored, and reference is made to the two patents referred to herein for the purpose of enabling a complete understanding of how power is applied to the transmission in the present case.

The housing 10 encloses drive means including a first or transmission shaft 18 which extends across the compartment 16 and into the compartment 17. In the latter compartment, the shaft has fixed thereto a relatively large gear 19 which is driven from the engine crank shaft (not shown) as illustrated in the patents referred to above. Within the compartment 16, the shaft 18 carries a plurality of shiftable gears 20, the particular identities of which are immaterial in the present case. These gears are selectively engageable with a plurality of gears 21 on a countershaft cluster 22. The countershaft cluster includes a shaft extension 23 which projects into the compartment 17 and carries a shiftable gear 24. Within the compartment 17, and inwardly of the driving gear 19, the shaft 18 carries a smaller gear 25 into and out of engagement with which the gear 24 may be shifted. The gearing 20 and 21 provides drive means in the compartment 16 and the gearing 24 and 25 provides drive means in the compartment 17.

Upper portions of the walls 13 and 14 provide spaced apart supporting portions for carrying means for controlling or shifting the shiftable gears 20 in the compartment 16 and the shiftable gear 24 in the compartment 17. This control means comprises a plurality of shifter rods 26, 27 and 28. The upper portion of the wall 14 has a pair of recesses or sockets 29 and 30 which carry proximate ends of the shifter rods 26 and 27. The opposite wall 13 has a pair of openings or bores 31 and 32 into which the opposite ends of the rods 26 and 27 extend. The rods 26 and 27 are thus supported at their opposite ends by the walls 13 and 14, and, preferably, these rods are fixed against endwise movement, representative means for such purpose being indicated at 33 and 34 in Figure 6.

The rod 28 is slidably carried by the walls 13 and 14 and extends across the compartment 16, through an opening 35 in the wall 14, and into the compartment 17. Within the compartment 17 the rod 28 has secured thereto a shifter fork 36 which engages with a conventional shifter collar 37 on the shiftable gear 24. At its other end, the rod 28 extends through the wall 13 by means of an opening or bore 38 provided therein (Figure 5).

The wall 13 shown in the particular construction happens to be an external wall; although, it could just as well be a separating wall between the compartment 16 and another compartment. Hence, the particular construction illustrated is not intended to import any limitations into the present application. Considered in the light of the foregoing remarks, the wall 13 has an interior side within or exposed to the compartment 16 and an exterior side exposed, in the present case, at the exterior of the housing 10. The openings 31, 32 and 38 extend completely through the wall 13 between its interior and exterior sides.

It is one of the features of the present invention to provide means for enclosing the openings in which the shifter rods 26, 27 and 28 are carried and to provide this means as a lubricant reservoir for lubricating at least the proximate end of the slidable shifter rod 28 and for supplying lubricant to other parts of the assembly. For this purpose, the exterior side of the wall 13 carries a cover or housing member 39 which is removably but tightly secured to the wall as by a pair of cap screws 40, a gasket 41 being interposed between the wall and the cover to provide a lubricant- and dust-tight seal. The interior of the cover is formed as a pocket or reservoir 42 which enables the cover to contain a quantity of lubricant, the supply of which will be presently described. The pocket or cavity in the cover 39 is sufficiently large to overlap the openings 31, 32 and 38 and a pair of additional openings 43 and 44.

The shifter rods 26, 27 and 28 lie substantially in the same general horizontal plane at a level considerably above the lubricant level in the compartment 16, which level is indicated at L in Figure 1. The opening 44 through the wall 13 is disposed at a level below that of the shifter rods; and the opening 43 is at a level above that of the opening 44. The openings 43 and 44, like the openings 31, 32 and 38, communicate between the interior and exterior sides of the wall 13 and open into the pocket 42 of the cover 39.

Lubricant is supplied to the reservoir or pocket 42 through the opening 43 by means of a lubricant supply member in the form of a tube 45 which extends inwardly and downwardly in the compartment 16 to a lubricant outlet 46 of a lubricant pump 47 (Figure 1). The pump 47 is shown as being located at a lower portion of the housing 10 in the compartment 16; although, the pump could be located in any other suitable place. The pump has a lubricant intake 48 by means of which the pump draws lubricant from the supply contained in the compartment 16. The pump operates in the usual manner to discharge lubricant through the outlet 46, into the tube 45, and thence into the pocket or reservoir 42 via the opening 43. The reservoir 42 thus provides means for containing a quantity of lubricant at a level considerably above the level of the lubricant in the compartment 16.

Communicating with the lowermost opening 44 is a lubricant-distributing member which is here shown in the form of a tube 49 that extends completely across the compartment 16 and into the compartment 17, as indicated at 50 in Figure 2. The end of the tube 49 proximate to the wall 13 fits tightly within the opening 44 so that that end of the tube is in communication with the reservoir or pocket 42. The tube is provided intermediate its ends with a plurality of perforations or openings 51 preferably located respectively above the gears 20 and 21 in the compartment 16, and with at least one opening or perforation 52 above the gear 25 in the compartment 17. Since the supply of lubricant through the tube 45 by the pump 47 to the cavity 42 is in an amount substantially greater than that distributed by the tube 49, and since the opening 44 is lower than the opening 43, the tube 49 is enabled to feed quantities of lubricant through the perforations 51 and 52 to the gears 20, 21 and 25. A considerable head of lubricant may be contained in the reservoir 42 to lubricate the bearing provided at the opening 38 for the proximate end of the slidable shifter rod 28. At the same time, the enclosure of the locating and securing means 33 and 34 by the cover 39 keeps the means free from dirt and rust.

The pump 47 is driven by means of a gear 53 which may be driven by a worm (not shown) on a shaft 54 running transverse to the transmission shaft 18. The shaft 54 has a bevel pinion 55 keyed thereto and in mesh with a bevel pinion 56 keyed to a shaft 57 at right angles to the shaft 54. The means for driving the shaft 57 may include a gear, shown in dot-dash lines at 58 in Figure 1, which may in turn be driven by any suitable connection to the power source of the vehicle in which the transmission is used.

The shifter rod 26 carries slidably thereon a control member 59 to which is connected a shifter fork 60 for shifting one of the gears 20. The shifter rod 27 carries a pair of members 61 and 62 which are provided respectively with shifter forks 63 and 64 for shifting other of the gears 20. The members 59, 61 and 62 are grooved in alignment and transverse to the extent of the shifter rods to selectively receive the lower end of a shifting member 65. The slidable rod 28 includes a member 66 which is positioned to receive the shifting member 65.

Features and objetcs of the invention not specifically referred to herein will undoubtedly occur to those versed in the art, as will numerous modifications and alterations in the preferred form of the invention disclosed, all of which may be achieved without departing from the spirit and scope of the invention as defined in the appended claims.

What is claimed is:

1. In a change-speed transmission having a housing adapted to contain lubricant at a certain level and carrying shiftable drive means and provided with spaced apart supporting portions, one of which has an interior side exposed to the interior of the housing and an exterior side outside the housing, the improvement comprising: means for shifting said drive means including a shifter rod extending between said supporting portions; means mounting said rod at its opposite ends in said supporting portions, including an opening in said one supporting portion and into which the proximate end of the rod extends to be exposed to the exterior side of said one supporting portion; cover means tightly secured to the exterior side of said one supporting portion over said opening and including a lubricant pocket with which said opening communicates; means providing a second opening through said one supporting portion communicating the interior of the housing and said pocket; and a lubricant supply member extending from the interior of the housing and communicating through said second opening with said pocket.

2. The invention defined in claim 1, further characterized in that: the shifter rod and said openings are above the lubricant level of the housing; and said supply member extends downwardly from said second opening at the interior side of said one supporting portion toward said lubricant level.

3. The invention defined in claim 1, further characterized in that: said one supporting portion has a third opening therethrough communicating said pocket and the interior of the housing; and a lubricant discharge member communicates with said third opening and extends interiorly of the housing over said shiftable drive means.

4. The invention defined in claim 3, further characterized in that: the shifter rod is generally horizontal; the third opening is at a level below said rod; and the second opening is at a level above that of the third opening.

5. In a change-speed transmission having a housing adapted to contain lubricant at a certain level and carrying shiftable drive means and provided with spaced apart supporting portions, one of which has an interior side exposed to the interior of the housing and an exterior side outside the housing, the improvement comprising: means for shifting said drive means including a pair of parallel, generally horizontal shifter rods disposed above the lubricant level in the housing and extending between said supporting portions; means mounting said rods at their opposite ends in said supporting portions, including a pair of openings through said one supporting portion into which the proximate ends of said rods extend, at least one of said rods being slidable in one opening, said proximate ends of the rods being thereby exposed through said openings to the exterior side of said one supporting portion; cover means tightly secured to the exterior side of said one supporting portion over said openings and including a lubricant pocket overlapping and facing said openings; and means for supplying lubricant to said pocket from the interior side of said one supporting portion, and hence to at least that opening in which said one rod is slidable, including an opening through said one supporting portion and communicating between the interior and exterior sides thereof and into said pocket.

6. The invention defined in claim 5, further characterized in that: said shifter rods lie generally in the same horizontal plane; a lubricant discharge opening is provided through said one supporting portion at a level below that of the shifter rods to communicate said pocket with the interior of the housing; said lubricant supply opening is at a level above that of the discharge opening; and a lubricant-conveying member is disposed within the housing above the drive means and connected to said discharge opening.

7. In drive mechanism including a housing having a lower portion adapted to contain lubricant at a certain level and carrying controllable drive means at least a portion of which is at times above the lubricant level, said housing including an upper supporting portion above the lubricant level, the improvement comprising: a lubricant pump carried by the housing, including a lubricant inlet below the lubricant level, and further including a lubricant outlet; lubricant reservoir means carried by said upper supporting portion of the housing; lubricant-conducting means connecting said reservoir and the pump outlet; lubricant-distributing means connected to the reservoir and extending over the drive means and above the lubricant level in the lower portion of the housing; and control means for the drive means including a movable member carried by the housing and having a portion extending into the reservoir.

8. In drive mechanism including a housing having a lower portion adapted to contain lubricant at a certain level and carrying controllable drive means at least a portion of which is at times above the lubricant level, said housing including an upper supporting portion above the lubricant level and having an interior side within the housing and an exterior side outside the housing, the improvement comprising: a lubricant pump carried by the housing, including a lubricant inlet below the lubricant level, and further including a lubricant outlet; lubricant reservoir means carried by said upper supporting portion of the housing at the exterior side thereof; lubricant-conducting means connecting said reservoir and the pump outlet, including a passage through said supporting portion between the interior and exterior sides thereof; lubricant-distributing means connected to the reservoir and extending over the drive means and above the lubricant level in the lower portion of the housing, and including a second passage through said supporting portion between the interior and exterior sides thereof; means providing an opening through said supporting portion extending between the interior and exterior sides thereof and communicating with said reservoir means; and control means for the drive means including a movable member carried by the housing and having a portion extending into said opening.

9. In driven mechanism including a housing having first and second compartments, at least the first of which is adapted to contain lubricant at a certain level, controllable drive means carried in the first compartment and having a portion above the lubricant level and controllable drive means in the second compartment, said housing including an inner wall portion separating the compartments and an outer wall spaced across the first compartment from the inner wall, the improvement comprising: a lubricant pump carried by the housing, including a lubricant intake below the lubricant level, and further including a lubricant outlet; means providing a lubricant reservoir on the outer wall portion at a level above the lubricant level; lubricant-conducting means connected between the reservoir means and the pump outlet; control means for the drive means including a pair of members, one of which extends across the first compartment between the inner and outer wall portions and the other of which extends across the first compartment and through the inner wall portion and into the second compartment; and means, including a pair of openings extending through the outer wall portion and communicating with the reservoir means, for supporting the outer end portions of the members and for exposing said ends of the members to lubricant in said reservoir means.

10. In drive mechanism including a housing having first and second compartments, at least the first of which is adapted to contain lubricant at a certain level, controllable drive means carried in the second compartment, said housing including an inner wall portion separating the compartments and an outer wall spaced across the first compartment from the inner wall, the improvement comprising: a lubricant pump carried by the housing, including a lubricant intake below the lubricant level, and further including a lubricant outlet; means providing a lubricant reservoir on the outer wall portion at a level above the lubricant level; lubricant-conducting means connected between the reservoir means and the pump outlet; control means for the drive means including a member, extending across the first compartment between the inner and outer wall portions and through the inner wall portion and into the second compartment; and means, including an opening extending through the outer wall portion and communicating with the reservoir means, for supporting the outer end portion of the member and for exposing said end of the member to lubricant in said reservoir means.

11. The invention defined in claim 1, further characterized in that: said one supporting portion has a third opening therethrough communicating said pocket and the interior of the housing; and a lubricant discharge member communicates with said third opening and extends interiorly of the housing over said shiftable drive means, said lubricant discharge member including a perforated tube extending over the drive means and generally paralleling the shifter rod.

BARRETT G. RICH.

REFERENCES CITED

The following references are of record in the file of this patent:

UNITED STATES PATENTS

| Number | Name | Date |
|---|---|---|
| 1,429,466 | Turnbull | Sept. 19, 1922 |
| 1,858,533 | White | May 17, 1932 |
| 1,988,440 | Cotterman | Jan. 22, 1935 |
| 2,323,384 | Eberhard | July 6, 1943 |
| 2,328,519 | Wahlberg | Aug. 31, 1943 |